United States Patent [19]

Johnson et al.

[11] 3,979,886

[45] Sept. 14, 1976

[54] SADDLE OVERLYING HORSE BLANKET

[76] Inventors: William Lay-Fayette Johnson, 1041 Sunset Road, Napa, Calif. 94558; Carl William Lindell, 672 Santa Maria Road, El Sobrante, Calif. 94803

[22] Filed: Oct. 14, 1975

[21] Appl. No.: 621,864

[52] U.S. Cl. .................................................. 54/79
[51] Int. Cl.² ............................................ B68C 5/00
[58] Field of Search .................................... 54/79, 80

[56] References Cited
UNITED STATES PATENTS

| 312,880 | 2/1885 | McPherson | 54/79 |
| 939,662 | 11/1909 | Burwell | 54/79 |
| 1,028,138 | 6/1912 | Schleicher | 54/79 |

*Primary Examiner*—Jack Q. Lever
*Attorney, Agent, or Firm*—Flehr, Hohbach, Test, Albritton & Herbert

[57] ABSTRACT

A horse blanket for placing over the top of a saddle which is mounted on the back of a horse. The saddle has a forward located saddle horn and depending saddle members which are subject to damage by contact with objects against which the horse may brush, especially in transporting the horse from place to place in a horse trailer. The saddle blanket has a back portion which contains a boot for fitting over the saddle horn and a neck portion for extending forward over the horse's neck and withers. Depending side portions are included on the blanket which extend downwardy to a level for completely covering the depending saddle members. A surcingle is attached to one of the depending sides of the blanket, having a free end for extending underneath the horse's belly. The other depending portion of the blanket as attached thereto means for receiving the free end of the surcingle and for fastening it thereto. Ths surcingle may be adjustably drawn up to fit snugly against the horse's belly, thereby firmly securing the blanket to the horse's back overlying the saddle. In this fashion the blanket is prevented from rotating or translating relative to the horse's back. A tail piece may be installed for depending from the horse's rump for further restricting translational movement of the blanket on the horse's back. Means may be attached to the depending sides of the blanket overlying the area of the horse's shoulders for surrounding the horse's chest, thereby providing additional means for preventing translation of the blanket when applied to the horse's back overlying the mounted saddle.

10 Claims, 4 Drawing Figures

SADDLE OVERLYING HORSE BLANKET

BACKGROUND OF THE INVENTION

A blanket is disclosed for overlying a saddle mounted on the back of a horse, and more particularly a blanket is disclosed for use in preventing chilling of an exercised horse and for protecting the mounted saddle from being damaged due to contact with objects the horse brushes against.

Horse blankets are well known devices for protecting horses, particularly for preventing chilling of a horse after exercise. The majority of such blankets are formed to fit the back of the horse and may not be applied until the saddle is removed from the horse's back. The dilemma therefore arises in which the saddle must either be removed from the horse to place the blanket on the horse's back or the saddle must be left on the horse's back leaving both saddle and horse in an exposed condition. A blanket is therefore needed which may be used for protecting the saddle while it is mounted on the horse during periods of transport of the horse from one location to another, and for preventing chilling of an exercised horse during such transport without requiring removal of the saddle from the horse's back.

SUMMARY AND OBJECTS OF THE INVENTION

A horse blanket is disclosed which overlies a saddle which is mounted on the back of a horse. This saddle typically has a forwardly positioned saddle horn. A back portion is included in the blanket for overlying the back of the horse. The back portion includes depending sides extending downwardly on each side of the horse. A boot is attached to the back portion for overlying the saddle horn. A surcingle is attached to one of the depending sides of the blanket and has a free end extending therefrom. The other depending side of the blanket has a fastener attached thereto for receiving and securing the free end of the surcingle. When the blanket is placed overlying the saddle mounted on the horse's back with the boot covering the saddle horn, the surcingle is passed under and drawn up snugly against the horse's belly, whereby the boot and the surcingle firmly retain the blanket rotationally and translationally on the horse's back, the horse is protected from chilling, and the saddle is protected from damage.

In general it is an object of the present invention to provide a horse blanket for protecting the component parts of a saddle mounted on a horse's back during transport of the horse from one location to another.

It is another object of the present invention to provide a horse blanket which is applied over a mounted saddle on a horse's back for preventing chilling of the horse.

It is another object of the present invention to provide a horse blanket which is conveniently placed atop a saddle mounted on a horse's back so that the saddle need not be removed therefrom during transport.

Additional objects of the invention will appear by reference to the following description of the preferred embodiments and the associated drawings.

DESCRIPTION OF THE PREFERRED EMBODIMENTS

Figure 1:
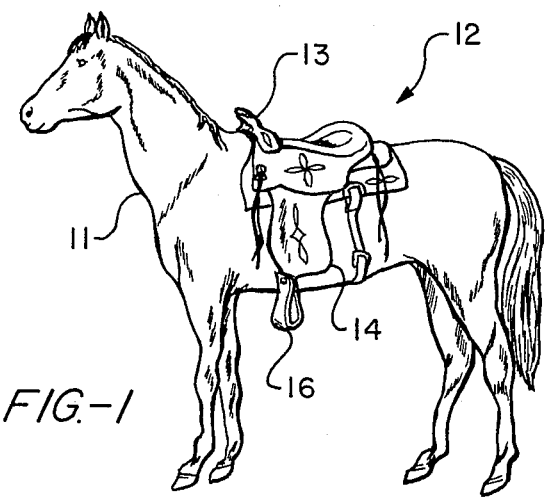
FIG. 1 shows a horse having a saddle mounted on the back thereof.

FIG. 1 shows a horse 11 having a saddle shown generally at 12 on which is positioned a forwardly located saddle horn 13. The saddle 12 also has depending saddle members 14 associated with stirrups 16. Depending saddle members 14 are oftentimes of fancy tooled leather and may contain decorative metal inserts.

Figure 2:
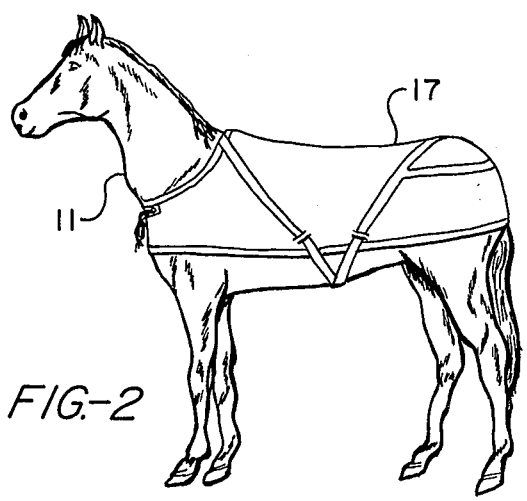
FIG. 2 shows a horse having a blanket which is old in the art, mounted on the horse's back.

FIG. 2 shows a conventional horse blanket 17 for application to the back of a horse 11. Blanket 17 is contoured to closely fit the back of the horse 11, and therefore saddle 12 must be removed therefrom prior to positioning blanket 17 on the horse's back.

Figure 3:
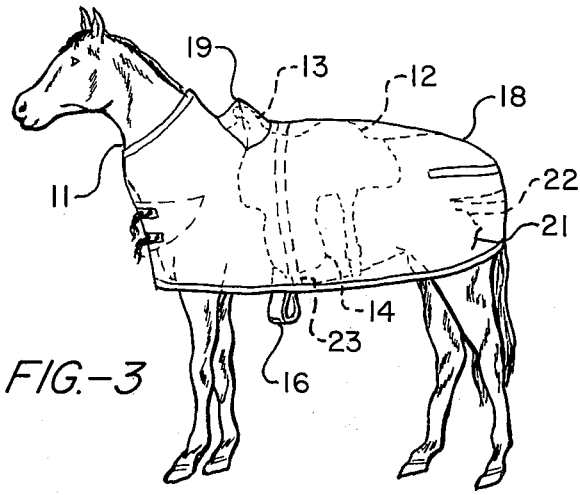
FIG. 3 shows the disclosed blanket placed overlying a saddle mounted on the horse's back.

FIG. 3 shows the disclosed horse blanket 18 mounted on the back of the horse 11 overlying the saddle 12 mounted on the horse's back. Blanket 18 has a boot 19 located thereon formed to overlie the saddle horn 13. The blanket 18 also has depending sides 21 and 22 extending downwardly from the back of the horse 11 to overlie all of the depending saddle members 14. A surcingle 23 is shown in dashed line in FIG. 3 and is fastened to the inside of depending side 21 for extending underneath the horse's belly to be fastened to the other depending side 22 for securing the horse blanket 18 to the back of the horse overlying saddle 12.

Figure 4:
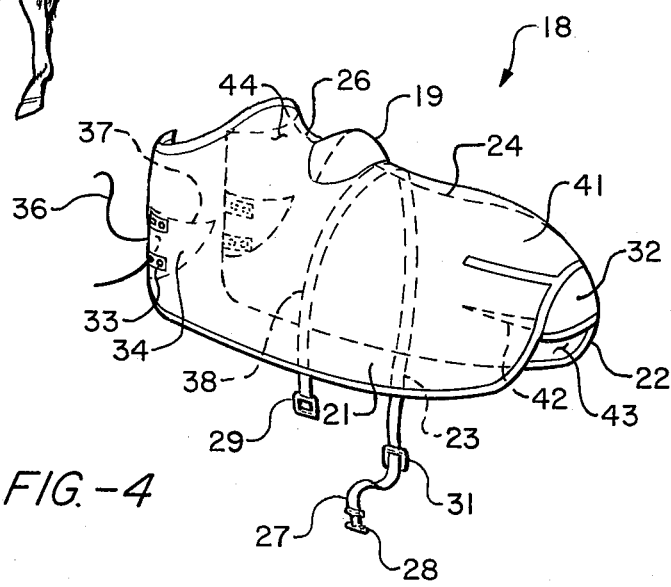
FIG. 4 is an isometric view of the disclosed horse blanket.

Referring now to FIG. 4, horse blanket 18 is shown in isometric view. A back portion 24 is formed for overlying the horse's back and saddle 12 having the depending sides 21 and 22 attached thereto. Boot 19 is located in back portion 24 and a neck portion 26 is shown extending beyond boot 19 for overlying the horse's neck and withers. Surcingle 23 is shown having a free end 27 to which a fastener 28 is attached. Fastener 28 may be of the "T" hook variety as shown. A fastener receiver 29 is attached to the depending side 22 for receiving fastener 28 and securing it therein. Adjustment means 31 are provided in surcingle 23 for adjusting the length of surcingle 23.

A tail piece 32 may be attached to the back portion 24 of blanket 18 for depending over the rump of the horse 11. Eyes 33 may be formed in a shoulder portion 34 of depending sides 21 and 22. Eyes 33 are formed to receive means such as cinching line 36 for surrounding the chest of horse 11 when applied thereto. Reinforcing stitching 37 is applied to the shoulder portion 34 for undertaking the strain applied to eyes 33 by cinching line 36. It should also be noted that surcingle 23 is fastened over a considerable length on the inside of depending side 21 as shown at 38. A member 39 attached to fastener receiver 29 is attached to the inner side of depending side 22 over a considerable length for firmly securing fastener receiver 29 thereto.

The manner in which blanket 18 is applied to the back of a horse overlying saddle 12 will now be described. It is desirable to apply the blanket overlying the saddle 12 in many instances, such as the situation where a horse is to be transported from its livery by way of a horse trailer, for example, to a remote location for riding. In such an instance the depending saddle members 14 are subject to damage as the horse brushes against hard objects in the horse trailer, for example.

Horse blanket 18 completely protects the depending saddle member 14 when it is placed on the horse's back overlying saddle 12. The lower edges of depending sides 21 and 22 extend well below the lower level of depending saddle members 14. Boot 19 is overlying saddle horn 13 and blanket 18 is properly positioned on the back of the horse 11. Surcingle 23 is led underneath the horse's belly and fastener 28 is engaged in fastener receiver 29. Adjusting means 31 are manipulated to draw surcingle 23 snugly against the horse's belly, thereby bringing blanket 18 down snugly against the upper surface of saddle 12 and the horse's back. In this fashion, blanket 18 may not rotate about the horse's back due to the positioning feature of saddle horn 13 inside boot 19. Blanket 18 may not translate along the horse's back due to the same mating feature of saddle horn 13 in boot 19.

If tail piece 32 is present as a part of blanket 18, it further prohibits translational movement of blanket 18 on the horse's back. If yet further assurance of prevention of translational motion on the horse's back is required or if means are required to hold depending sides 21 and 22 close to the horse's sides and depending saddle members 24, line 36 is led into eyes 33 in shoulder portion 34 and around the chest of the horse to thereby firmly hold depending sides 21 and 22 down adjacent to the horse's side and overlying depending saddle members 14. Neck portion 26 is seen to extend well up along the horse's neck to overlie the base portion of the neck and the withers of the horse.

Upon completion of riding the horse 11 at the remote location, the blanket 18 may be applied over the saddle 12 and the back of the horse 11 as described above, thereby eliminating the inconvenience of removing saddle 12 from the back of the horse at the remote location. The forwardly extending neck portion 26 together with the long depending sides 21 and 23 are sufficient to prevent the exercised horse from chilling as well as protecting the saddle 12 from damage during transport back to the horse's livery.

It should be noted that a rear portion 41 on depending sides 21 and 22 has darts 42 formed therein for forming the blanket 18 to generally conform to the horse's rump. It should also be noted that an inner surface 43 is provided in blanket 18 which is non-abrasive and preferably of soft material for preventing chafing to the horse 11 as well as preventing rubbing against and abrasion to the surfaces of the saddle 12 exposed thereto. It should also be noted that blanket 18 may have an outer surface 44 which is water repellant for protecting the horse 11 and the saddle 12 during inclement weather.

A saddle overlying horse blanket has been disclosed which provides for protection of saddle leather generally and intricately tooled saddle members particularly, while the saddle is mounted on the horse's back as well as providing for protection of the horse against chill or exposure to inclement weather.

What is claimed is:

1. A blanket for placement over a horse's back overlying a saddle mounted thereon, comprising
    a boot for overlying a horn on the saddle,
    a neck portion adjacent to one side of said boot for overlying the horse's neck,
    depending side portions formed to overlie said neck portion and joined on the other side of said boot for extending from the horse's chest to the horse's rump,
    a surcingle having one end attached to one of said depending side portions and having a free end,
    and means for fastening attached to the other of said depending side portions for receiving said free end of said surcingle, so that when said boot is positioned over the horn portion of the saddle on the horse's back and said means for fastening receives the free end of said surcingle, the horse and saddle are protected and the blanket is prevented from rotating or translating relative to the horse's back.

2. A blanket as in claim 1 together with a tailpiece attached between the ends of said depending side portions for passing behind the horse's rump.

3. A blanket as in claim 1 wherein said surcingle includes means for adjusting the length thereof for securing the blanket snugly against the saddle and the horse's back.

4. A blanket as in claim 1 together with a chest strap, and means for fastening opposite ends of said chest strap to each of said depending side portions below said neck portion for maintaining said depending side portions against the sides of the horse.

5. A blanket as in claim 1 wherein said neck portions, boot and depending side portions include non-abrasive inner linings, whereby the underlying portions of the horse and the saddle are free from chafing and abrasive wear during prolonged use.

6. A horse blanket for overlying a saddle mounted on a horse's back comprising a back portion for overlying the back of the horse and for depending on each side thereof, a boot attached to said back portion adapted to overlie a horn on the saddle, a surcingle attached to one side of said back portion and havinhg a free end extending therefrom, means for receiving and fastening said free end attached to the other side of said back portion, whereby the blanket is secured in place on the horse's back covering the saddle when the surcingle is passed under and drawn up snugly against the horse's belly and fastened in said means for receiving, and the saddle is protected from damage by contact with objects the horse brushes against.

7. A horse blanket as in claim 6 together with a neck portion attached to said boot for extending over the horse's neck, whereby the horse is prevented from chilling after exercise without removing the saddle.

8. A horse blanket as in claim 6 together with a tailpiece attached to said back portion for depending over the horse's rump.

9. A horse blanket as in claim 6 wherein the saddle structure susceptible to damage by sharp objects extends to a lower level on each side of the horse, and wherein said back portion depending on each side extends at least to said lower level.

10. A horse blanket as in claim 6 wherein the saddle has depending members and said back portion has a shoulder portion, together with means for surrounding the chest of said horse attached to said shoulder portion for retaining the back portion depending on each side of the horse to immediately overlie the saddle depending members and the sides of the horse.

* * * * *